United States Patent [19]

Wiklund et al.

[11] 4,229,102
[45] Oct. 21, 1980

[54] METHOD AND APPARATUS FOR BALANCING OUT DISTURBANCES IN DISTANCE MEASURING SYSTEMS

[75] Inventors: Klas R. Wiklund; Lars A. Ericsson, both of Täby, Sweden

[73] Assignee: AGA Aktiebolag, Lidingo, Sweden

[21] Appl. No.: 907,577

[22] Filed: May 19, 1978

[30] Foreign Application Priority Data

Jun. 3, 1977 [SE] Sweden ............................. 7706290

[51] Int. Cl.² ............................................. G01C 3/08
[52] U.S. Cl. ..................................... 356/5; 343/12 R; 343/14
[58] Field of Search ............... 356/5; 343/12 R, 14 R, 343/12 A; 340/1 R

[56] References Cited

U.S. PATENT DOCUMENTS

| | | | |
|---|---|---|---|
| 2,982,167 | 5/1961 | Friden et al. | 356/5 |
| 3,619,058 | 11/1971 | Hewlett | 356/5 |
| 3,634,860 | 1/1972 | Rittenbach | 343/12 R |
| 3,723,002 | 3/1973 | Everest et al. | 356/5 |
| 3,740,141 | 6/1973 | Dewitt, Jr. | 356/5 |
| 3,874,296 | 4/1975 | Hedemark | 343/14 |
| 4,025,193 | 5/1977 | Pond et al. | 356/5 |

FOREIGN PATENT DOCUMENTS

| | | | |
|---|---|---|---|
| 1074093 | 10/1954 | France | 343/14 |
| 655960 | 8/1951 | United Kingdom | 356/5 |

*Primary Examiner*—S. C. Buczinski
*Attorney, Agent, or Firm*—Larson, Taylor and Hinds

[57] ABSTRACT

A method and apparatus are provided for balancing out interference caused by stray coupling between the internal circuits of a distance measuring apparatus of the phase-type in a simple manner which produces a substantial increase of the usable measuring range. At least two groups of mutually separate distance measurements are performed, with each group including at least one measurement operation. For each pair of groups of distance measurements, one measuring group is effected with the transmitter signal in a first phase and the other measuring group is effected with the transmitter unit of the transmitter section supplied with a transmitter signal in a second phase which is displaced substantially 180° relative to the first phase. The mean value or the mean values of the measuring results in each measurement group are thereafter formed, with this calculation being made either by hand or automatically. Preferably, the invention includes a controllable phase shifter to provide the phase shift of the measurement signals supplied to the transmitter.

13 Claims, 5 Drawing Figures

METHOD AND APPARATUS FOR BALANCING OUT DISTURBANCES IN DISTANCE MEASURING SYSTEMS

The present invention relates to a method of balancing out inner disturbances in a distance measuring apparatus, and a means for carrying out the method.

In a distance measuring apparatus of the phaseposition indicating type there is transmitted a light beam modulated by a signal of a given frequency, which signal is preferably of pulseform, but may also be sinosoidal. When the transmitted beam has been reflected at the measurement point it is received by an objective system located parallel with or coaxial with the transmitter objective, where it is caused to influence a light-sensitive cell which produces an electric output signal proportional to the intensity of the incoming light. The phase of this signal is compared with the phase of the transmitted signal by mixing said signal with the signal from a local oscillator whose frequency differs from the transmitted frequency a given, relatively low frequency $\Delta f$ in a mixing stage associated with the receiver. The phase angle $\phi$ of the mixed signal is changed with a change in the distance.

Calibration is effected at each measuring operation by optically measuring an internal path in the instrument having a known length. In this way there is eliminated, inter alia, any constant phase shift between the oscillator and the modulated light transmitted from the transmitter. It follows from this that an applied phase shift e.g. phase reversal, effected before the transmitter will not affect the measuring result.

Interference signals also occur in the receiver as a result of stray coupling from the internal circuits in the distance-measuring apparatus, these interference signals being added in the receiver vectorially to the incoming signal, i.e. with that phase relationship which the interference has to the incoming signal. The interference will therefore influence the phase of the received signal, this influence being insignificant provided that the magnitude of the incoming signal is large relative to the magnitude of the interference.

As is known, the ratio between the energy received and the energy transmitted for the measurement signal will be smaller the longer the distance to be measured is. In order for the strength of the signal obtained to be acceptable for signal processing when measuring long distances, the power of the transmitted signal is often increased.

The output signal, however, cannot be of any strength whatsoever. Firstly, the transmitted signal may exceed the limit values set by the authorities, particularly if the measuring apparatus functions with laser light. Secondly, the interference signals become stronger with more powerful output signals.

The result of this is that there is a great need to maintain the strength of the output signal as low as possible whilst providing a distance-measuring apparatus whose range is as wide as possible.

Previously, this has led to contradictory requirements, In order to overcome the problems of the prior art, the present invention provides a method of balancing out interference caused by stray coupling between the internal circuits of a distance-measuring apparatus of the phase-type having a receiver section and a transmitter section, in which phase measurement of modulated electro-magnetic radiation transmitted from the transmitter section, reflected by a measurement target and received by the receiver section is carried out with reference to a signal which is transmitted from the transmitter section via a distance of known length to the receiver, and received by said receiver, and which has the same frequency and phase when transmitted as the electro-magnetic radiation transmitted to the measurement target. At least two groups of separate distance measurements are carried out each comprising at least one measuring operation, wherein for each pair of groups the one measuring group is effected with the transmitter element of the transmitter section supplied with a transmitter signal in a first phase, and the other measurement group is effected with the transmitter element of the transmitter section supplied with the transmitter signal in a second phase which is displaced substantially 180° relative to the first phase, the mean value being formed of the mean values of the measuring results in each measurement group.

Preferably the same number of measuring operations are carried out in each group, the mean value being formed from the result of all measuring operations. Measurements belonging to different measurement groups could be taken alternately in the different measurement groups but it is also possible to take the measurements belonging to different measurement groups in such a way that all the measurements are taken in a series within each group per se.

Furthermore, according to an object of the invention a plurality of pairs of measurement groups are effected, wherewith a given phase displacement is introduced between each pair of measurement groups.

Other objects and advantages of this invention as well as a more complete understanding thereof may be obtained from the following more detailed description and the accompanying drawings in which.

Because the interference signals are determined by the different electrical circuits in the distance measuring apparatus, such as the main oscillator, the local oscillator, mixing stages etc., the interference always has the same phase whilst the phase of the received signal changes with the changes in the distance measured. If a graph is drawn with the incoming measurement signal as a vector $u_1$, and if this vector is fixed in space, so that the coordinate system will consequently rotate with the distance measured, and if an interference signal $u_2$ is added vector-wise to said vector $u_1$, see FIG. 1, the interference signal vector $u_2$ will rotate for continuously increasing or decreasing distances around a circle having a centre at the apex of the vector $u_1$. In this way there is obtained a phase error $\Delta\phi_1$, in relation to the actual phase of the measurement signal, this phase error reaching at most to $$\Delta\phi = u_2/u_1 \text{ rad}$$

naturally providing that $|u_1| << |u_2|$. In the case of a measuring frequency of 15 MHz the measuring error will be $$\Delta D = (u_2/u_1) \cdot (10\,000/2\pi)\,\text{mm}$$

where $\lambda/2 \approx 10\,000$ mm at the frequency 15 MHz.

Figure 1:
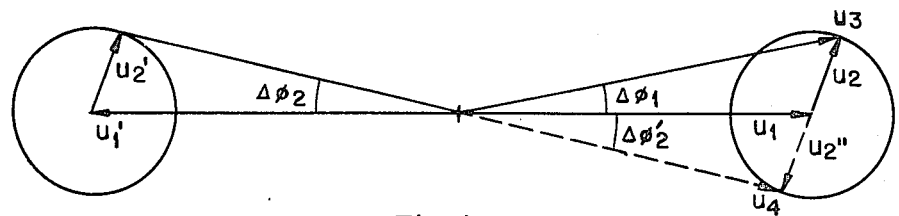
FIG. 1 is a diagram illustrating the invention.

If a measurement is now made with a transmitted signal which is in phase opposition to the previously transmitted signal, whose received portion has been represented by the vector $u_1$, there is obtained a received signal $u'_1$ in accordance with FIG. 1. An interference signal $u'_2$ which coincides in magnitude and phase with $u_2$ is added vectorially to the signal $u'_1$. It will then be seen that if the two vectors $u_1$ and $u'_1$ are oppositely directed, the additional phase positions, which are dependent on the interference signal, i.e. the phases $\Delta\phi_1$ and $\Delta\phi_2$, will be equally as great but oppositely directed relative to the signal actually received. It should be mentioned in this connection that it is in the receiver itself where the interference signal makes itself felt, and that the signal, which is transmitted from the receiver to the subsequent signal-processing circuits, consequently has the interference signal superimposed thereon. The signals with which the distance-measuring apparatus operates as information-carrying signals are consequently the signals $u_3$ and $u_4$ respectively.

If a distance-measuring operation is first carried out with the ordinary phase-displacement between the oscillator and the transmitter, whereupon the signal $u_1$ is received, and a new measuring operation is then carried out with an additional phase-displacement of 180° between the oscillator and transmitter, i.e. with the received signal $u'_1$, the result illustrated in FIG. 1 is obtained, where the interference signal $u'_2$ is replaced by the signal $u''_2$, which is shown as being effectively added to the signal $u_2$ with a 180° phase displacement as seen from the received signal. Any phase shift in the internal circuits before the actual transmitter is eliminated as a result of the calibration measurement made at each distancemeasuring operation through the internal loop, since the phase of the measurement signal and the calibration signal are subtracted from each other in the internal circuits.

Figure 2:
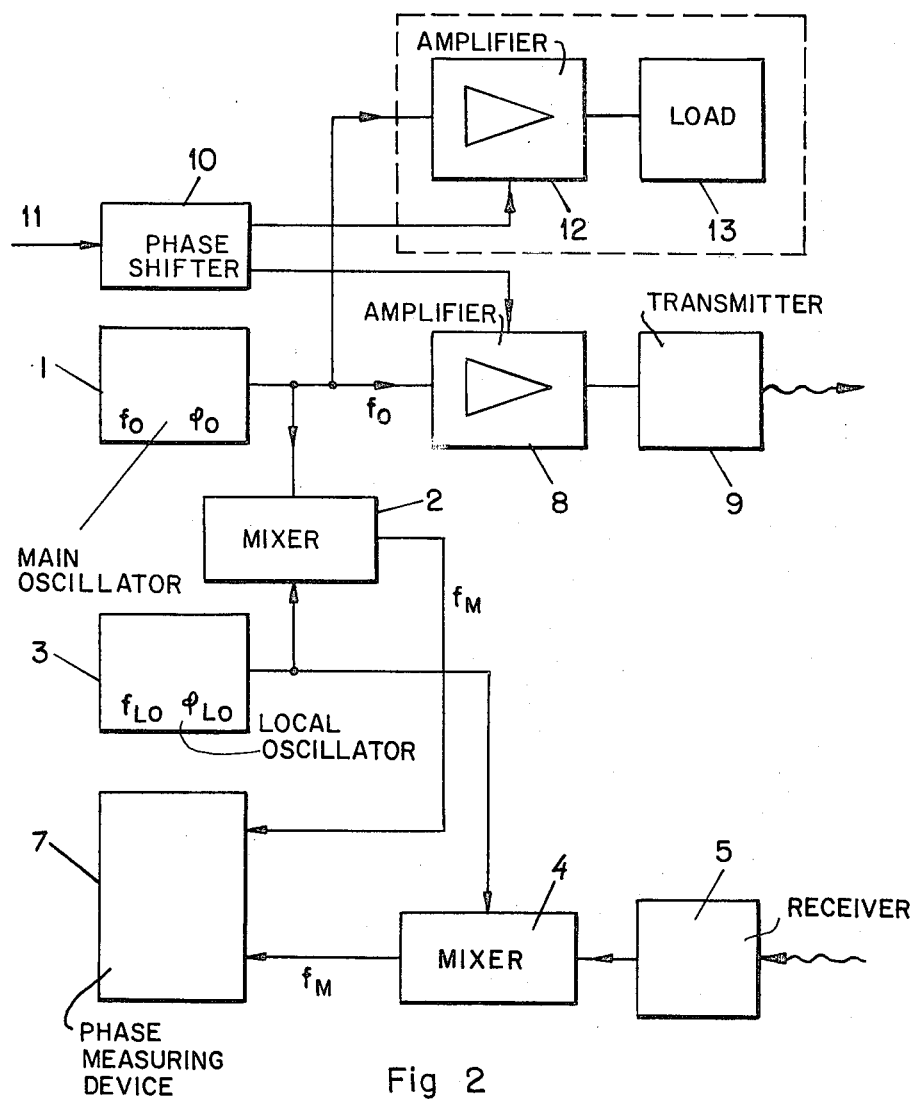
FIG. 2 is a block schematic of an embodiment of a distance measuring apparatus to which the invention can be applied.

FIG. 2 illustrates a block schematic of an embodiment of a distance-measuring apparatus having phase-shift means in accordance with the invention. A main oscillator 1 emits a signal of frequency $f_0$, which is the modulation frequency of the transmitted light-signal. In addition there is provided a local oscillator 3 having a frequency $f_{LO}$, which is so selected that the difference between the frequency $f_{LO}$ and the frequency $f_0$ of the main oscillator is a low frequency $f_M$ relative to said frequencies, the frequency $f_M$ being obtained by feeding the signals from the main oscillator 1 and the local oscillator 3 to a mixer whose output signal is the difference frequency $f_M$. This signal also has the difference between the phase of the main oscillator 1 and the phase of the local oscillator 3, i.e. the phase $\phi_0 - \phi_{LO}$. It is the signal from the mixer 2 of frequency $f_M$ and phase $\phi_0 - \phi_{LO}$ which is used as the reference signal for a subsequent phase-measuring operation, and consequently this signal is applied to the reference input of a phase-measuring device 7.

For transmission purposes the signal is fed from the main oscillator 1 of frequency $f_0$ via a power amplifier 8 to a transmitter 9, which often has the form of a light-emitting diode of the IR-type, but which may also be a laser modulated with the frequency of the main oscillator. Since FIG. 2 is only intended to illustrate the principle of operation of the distance-measuring apparatus, not all circuits are shown in detail, which omission of course includes those which are not essential to the invention. These circuits, however, bring about a phase shift of the signal before it reaches the transmitter and in order to render the measuring operation completely independent of this phase shift, there is made with each distance-measurement a calibration measurement via an internal optical path in the transmitter, said path having a known length and thus a known phase shift for the signal, and hence each distance-measuring cycle comprises two distance-measuring operations of which one is made via the internal optical path and the other to and from the intended target. These two measurements are made in order, in a subsequent signal-processing operation, to lock the phase position of the signal obtained by measuring through the internal measuring path. It is also conceivable to lock the phases electrically by means of an electric signal from the transmitter, although it has been found in practice that varying phase shifts may occur in the electrical path of the signal from the transmitter, and hence the internal optical measurement provides more positive results. After all, the frequencies concerned are relatively high. Normally $f_0$ reaches approximately 15 MHz.

The output signal of the receiver 5 has the same frequency as the transmitted signal. In order to obtain the more practical lower frequency $f_M$ the output of the receiver is fed to a second mixer 4, the other input of which is connected to the output of the local oscillator 3. The output signal of the mixer 4 then has the frequency $f_M$ but it also obtains a phase position, which is the phase position from the receiver minus the phase position of the local oscillator. For dimensional reasons, which do not have a real connection with the intended invention, the phase position of the local oscillator 3 has to be compensated before the phase measuring device 7 could provide a phase comparison between a measuring through the internal measuring path and a measuring to and from the intended target. Therefore, the mixer 2 is provided, and the output thereof with the frequency $f_M$ and the phase position $\phi_0 - \phi_{LO}$ is fed to a second input of the phase measuring device 7. The elements 1 to 7 in FIG. 2 represent well known technics usually used in distance measuring devices.

Owing to the fact that the phases for the measurement signal are, in practice, locked, through the double measuring operation, to the phases of the signal in the actual transmitter, and thus not to the phases of any internal path of the distance-measuring apparatus, it is consequently possible to introduce a phase shift in the path of the signal to the transmitter, without influencing the measuring result in any way. This is utilised in accordance with the invention to compensate the aforementioned interference component $u_2$. Owing to the fact that at least two measurements are made, the first measurement being carried out with the signal to the transmitter in the normal phase and the other with a signal to the transmitter whose phase is reversed relative to the phase of the signal in the first measuring operation, and because the mean value is formed of the measuring results obtained with these two measuring operations, the interference signal is compensated for. Naturally, it is possible to take many measurements, the mean value of these measurements being formed. It is sufficient, however, for the mean value of the measurements with the normal phase to be compared with the mean value of the measurements with the phase in opposition thereto, i.e. that the mean value is formed from the result of the measurements in the normal phase and the phase in opposition thereto in balanced proportions. It should be mentioned in this connection that the interference signal has no significance in respect of the calibration measurement taken through the internal path since the signal received by the receiver in this measuring operation is strong and since it is only when weak signals are received that the interference signal obtains any significance.

FIG. 2 illustrates schematically the phase shift of the signal to the transmitter 9, where a phase-shift device 10 is arranged, when a signal is applied to a control input through an external control 11, to shift the phase of the signal in the power amplifier stage 8. This external control can be effected manually, e.g. by means of a button on the distance-measuring apparatus. The operator reads the values indicated on the distance-measuring apparatus and calculates the mean values manually.

Also illustrated in FIG. 2 is a second amplifier 12 whose input is coupled to the output of the main oscillator 1 and whose output signals are applied to a load 13. This amplifier 12 has substantially the same performance as the amplifier 8 and its output supplies a load which corresponds as closely as possible to the load which the transmitter 9 exerts on the amplifier 8. If, for example, the transmitter 9 comprises a light-emitting diode, the load 13 may comprise a diode or a plurality of diodes connected in series. The amplifier 12 is controlled by the phase-shift device 10 in a manner such that it works in phase opposition to the amplifier 8, whereby interference signals caused by the power amplifier are compensated to the highest possible extent, i.e. the interference signals become approximately equal irrespective of whether the amplifier 8 is operated in one phase or the other. The units 12 and 13 in FIG. 2 are enclosed by dash lines, which is meant to indicate that these units are not absolutely necessary to the invention.

Figure 3:
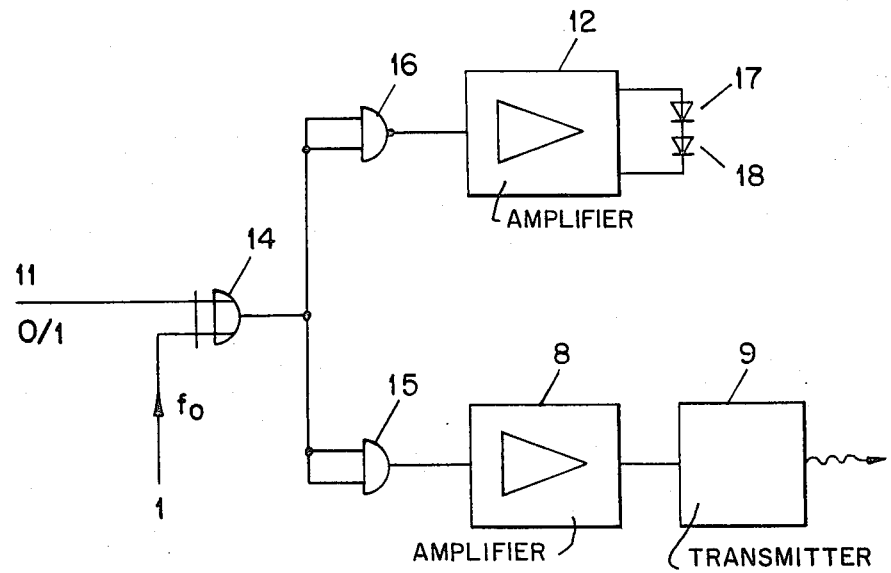
FIG. 3 illustrates an embodiment of a coupling circuit according to the invention.

FIG. 3 illustrates a simple embodiment of a coupling circuit for the phase shifting device 10. The pulse-like signal from the main oscillator 1 is coupled to one input of an EXCLUSIVE-OR gate 14 on whose other input there is applied a "0"-signal when the measurement is to be made in the normal phase and a "1"-signal when the measurement is to be made in anti-phase. The output of the EXCLUSIVE-OR gate 14 is coupled to the strapped inputs of an AND gate 15 and to the strapped inputs of a NAND gate 16. The output of the gate 15 is coupled to the input of the power amplifier 8, and the output of the gate 16 is coupled to the input of the power amplifier 12, whereby the two amplifiers will operate in anti-phase. The elements 15 and 16 are, of course, selected so that they are adapted to each other as closely as possible, it being particularly ensured that the signal delay caused by the elements is approximately the same. The load 13 is also illustrated in this embodiment as two diodes 17 and 18 connected in series.

In the embodiment illustrated in FIG. 2 the various distance-measuring operations with phase shifting are carried out by reading each distance indicated by the measuring apparatus in each phase, whereafter the mean value is calculated manually. As will be understood, the method as a whole, according to the invention, can be carried out fully automatically, the arrangement being such that the operator need only press a start button when a distance measurement is to be made and the result of the distance measurement with a picture of the mean value of a plurality of distance-measurement cycles being presented after a small delay on the display unit.

Figure 4:
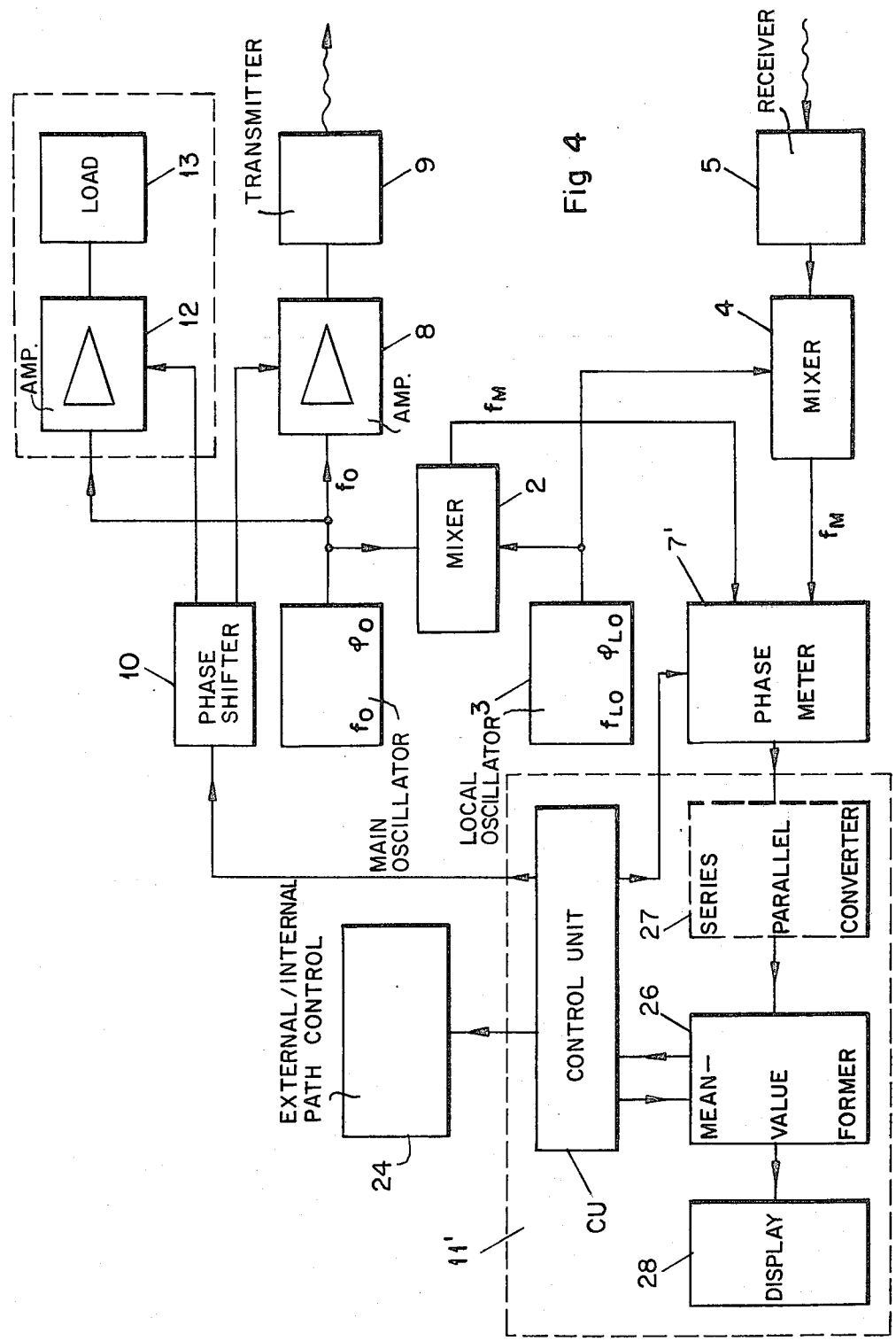

The right-hand part of the circuit shown in FIG. 2 is again illustrated in FIG. 4 together with an embodiment of an automatic unit 11 for automatically forming the aforementioned mean value. The automatic unit 11' comprises a control unit Cu which controls both the phase shift device 10 and the phase meter 7'. A distance measuring operation is often carried out in a manner such that the transmitter is continuously supplied with the modulated signal and the phase meter is activated at suitable points of time to measure the phase of the incoming signal. At the same time the unit 12 also controls a device 24 by means of which the internal and external measurement paths are connected in the circuit. The output signal of the phase meter 7' is then supplied to a means 26 for forming a mean value, optionally via a series-parallel converter indicated in dashed lines at 27 when the phase meter, for example, is of the type which feeds out a series of pulses over a given period of time the number of which pulses represent the phase, and when the mean-value former is, for example, a central signal-processing unit (CPU) with parallel inputs. The mean-value former may, for example, be arranged to store the result of a given number of measurements in different stores, whereafter it forms the mean value and feeds the result to a display unit 28. In the illustrated embodiment, the control unit is arranged, for each distance-measuring cycle, firstly to send a pulse to the phase shifting device 10 to change phase, and secondly to the means 24 for measuring the internal path. Thereafter it sends the pulse to the phase meter 7' which carries out a calibration measurement, thereafter it sends a pulse to the means 24 for measuring the external path and thereafter it sends the signal to the phase meter 7' for initiating the actual phase measuring operation, the result of which is fed to a store in the mean-value former 26. Upon termination of the read-in, the mean-value former 26 is commanded to move forward to the next store, so that said storage location is prepared to receive information concerning the next distance-measuring operation. The working cycle of the control unit then recommences. After a given number of working cycles, the mean-value former is controlled in a manner such that it forms the mean value of the distance-measuring information stored in the stores, this mean value being fed to the display unit 28, where it is presented in a normal manner.

The mean-value former 26 may also be of a type which continuously forms the mean value between incoming measurement information and a calculated mean value of measurements carried out in a previous series whilst taking into account the number of measurements made. A mean-value calculator of this type is described in Swedish Patent Application No. 7703644-0. The working sequence of the control unit CU described above may also be applied when using a mean-value former of the continuous type, with the exception that the calculated mean value may continuously be presented on the presentation unit as the mean value is formed, and when the given number of measurement operations has been carried out, the last calculated mean value may remain on the display unit and be read therefrom.

Figure 5:
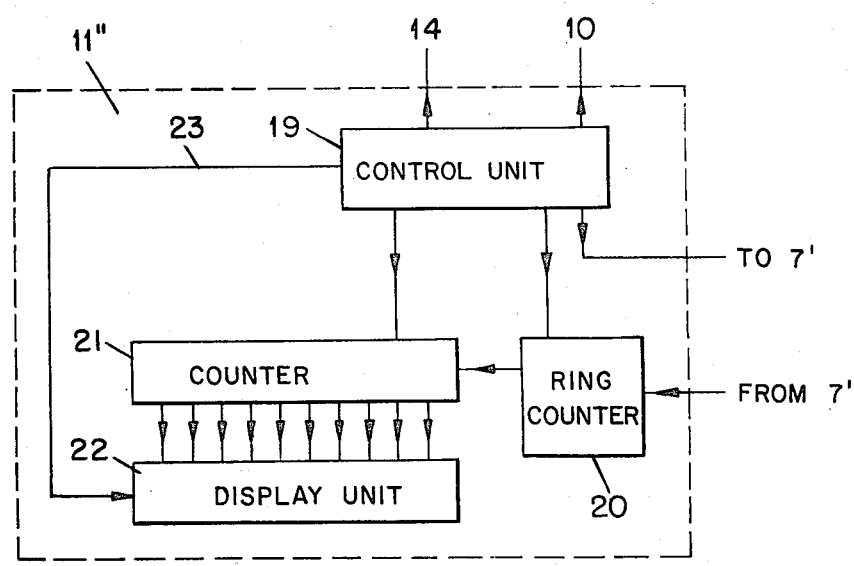
FIGS. 4 and 5 illustrates block schematic of two embodiments of a circuit incorporated in the apparatus according to the invention.

FIG. 5 illustrates another embodiment of the automatic unit 11" for automatically forming the mean value. This embodiment is particularly suited for such phase meters 13 as those which give the phase through a series of pulses which are emitted over a given period of time and the number of pulses of which is indicative of the measured distance. A control unit 19 controls the phase shift device 10, the phase meter and the device 14 in the same manner as that described with reference to the control unit 12 in the embodiment shown in FIG. 4. The pulses arriving from the phase meter 13 over said given period of time are applied to a ring counter 20. If the given number of measuring operations to be carried out in a distance-measuring series is designated N, then the ring counter is arranged to feed out a pulse for each N-th incoming pulse, which is fed to a counter 21. When the N measuring operations have been carried out, the mean value of these measurements is found in the counter and can be presented on the display unit 22 under control of the control unit 19 via the conductor 23.

Many different modifications are possible within the scope of the invention. For example, a first calibration measurement can be carried out, whereafter a first series of distance measurements to the target can be carried out in the same phase, whereafter the phase shift device 10 shifts to the other phase and a renewed calibration measurement with subsequent other series of distance measurements is carried out. The mean value of the different distance measurements is formed.

It is also possible to arrange the device 10 in a manner such that a given, small phase shift is introduced between each pair of measuring cycles with a phase change of 180° therebetween.

It has been assumed in the aforegoing that an equal number of measurements are made in the phases rotated through 180° relative to one another, although it will be understood that a different number of measurements can be taken with the phase shift device 10 in each phase position, and that the result of these measurements can be balanced together in dependence upon the number of measurements carried out in each phase. The arrangement may also be such that the mean value is formed by the measurements each per se carried out in each phase, and that the mean value is thereafter formed on the calculated mean value for measurements in each group of measurements.

We claim:

1. A method of balancing our interference caused by stray coupling between the internal circuits of a distance-measuring apparatus of the phase-type having a receiver section and a transmitter section, wherein a phase measurement operation is carried out which comprises an external phase measurement wherein a modulated electromagnetic signal is transmitted from the transmitter, reflected by a measurement target and received by a receiver section, and a reference measurement wherein a electromagnetic signal of the same frequency and phase of the first mentioned signal is transmitted from the transmitter section to the receiver section over an internal path of known length for comparison with the signal received by said receiver section during the external phase measurement; wherein at least two groups of separate distance measurements, each comprising at least one said phase measuring operation, are carried out; wherein for each pair of groups the one measuring group is effected with the transmitter unit of the transmitter section supplied with a transmitter signal of a first phase, and the other measurement group is effected with the transmitter unit of the transmitter section supplied with the transmitter signal of a second phase which is displaced substantially 180° relative to the first phase; and the mean value being formed of the mean values of the measuring results in each measurement group, a control unit being used to control switching between the external phase measurement and the reference measurement during each phase measurement operation and to control switching the phase of the transmitter signal between said first phase and said second phase during alternate measuring groups.

2. A method according to claim 1, wherein the same number of measuring operations are carried out in each group, the mean value being formed from the result of all measuring operations.

3. A method according to claim 2, wherein measurements belonging to different measurement groups are taken alternately in the different measurement groups.

4. A method according to claim 1, wherein the measurements belonging to different measurement groups are taken so that all the measurements are taken in a series within each group per se.

5. A method according to claim 1, wherein a plurality of pairs of measurement groups are effected, and wherein a given phase displacement is introduced between each pair of measurement groups.

6. A method according to claim 1, wherein the phase displacement is effected in the final stage of the transmitter unit of the transmitter section.

7. A method according to claim 1, wherein the phase during distance measurements in the first phase is different from the phase during distance measurements in the second phase and the transmitter section is provided with stages which substantially duplicate each other and which are operated in phase opposition.

8. A distance measuring apparatus of the phase-measuring type for making at least two groups of distance measurements and comprising a receiver section and a transmitter section including a transmitter unit, wherein a phase measurement operation is carried out which comprises an external phase measurement wherein a modulated electromagnetic signal is transmitted from the transmitter, reflected by a measurement target and received by a receiver section, and a reference measurement wherein a electromagnetic signal of the same frequency and phase of the first mentioned signal is transmitted from the transmitter section to the receiver section over an internal path of known length for comparison with the signal received by said receiver section during the external phase measurement, said apparatus further comprising a controllable phase-shift means for reversing the phase of the measurement signal for the transmitter unit of the transmitter section for each of the said at least two groups of measurements so that the phase of the measurement signal for one group is reversed with respect to the phase of the measurement signal of another group, said apparatus further comprising a control unit for controlling switching between the external phase measurement operation and for controlling switching the phase of the transmitter signal between said first phase and said second phase during the two measuring groups.

9. An apparatus according to claim 8, wherein the phase-shift means is arranged to control a final amplifier stage feeding the transmitter element.

10. An apparatus according to claim 8, wherein the phase-shift means comprises a unit having a control input which is connected, in the signal direction, before the final stage of the transmitter and is arranged when a first type of control signal is applied to its control input to feed out on its output the incoming signal to said unit in a first phase, and is arranged when a second type of control signal is applied to said control input to feed out said incoming signal in the opposite phase.

11. An apparatus according to claim 8, wherein the phase-shift means is arranged to provide an additional, selectable phase shift of the measurement signal for the transmitting element of the transmitter section.

12. An apparatus according to claim 8, further comprising a unit which is of a type similar to a unit in the transmitter whose operation is controlled by a phase change in the output of the phase shift means, and which is arranged to operate with a signal which is in opposition to the signal with which the latter unit operates.

13. An apparatus according to claim 8, wherein an automatic unit having a mean-value former is arranged to control the phase shift means and a unit in the distance measuring apparatus to carry out separate distance measuring operations and to calculate the mean value of the measuring results obtained with the separate measuring operations for a given sequence of distance measuring operations.

* * * * *